(12) United States Patent
Lin

(10) Patent No.: US 6,623,114 B2
(45) Date of Patent: Sep. 23, 2003

(54) GLASSES CAPABLE OF ACCOMMODATING AUTOMATICALLY

(76) Inventor: Chwen Yih Lin, 8F., No. 334-1, Jong Jeng Road, Baan Chyau City, Taipei Hsien (TW)

( * ) Notice: Subject to any disclaimer, the term of this patent is extended or adjusted under 35 U.S.C. 154(b) by 197 days.

(21) Appl. No.: 09/934,611

(22) Filed: Aug. 21, 2001

(65) Prior Publication Data

US 2003/0038919 A1 Feb. 27, 2003

(51) Int. Cl.⁷ .................................................. G02C 9/00
(52) U.S. Cl. ............................. 351/47; 351/41; 351/57
(58) Field of Search ............................. 351/47, 48, 57, 351/58, 120, 111, 41

(56) References Cited

U.S. PATENT DOCUMENTS 4,493,538 A * 1/1985 Tolliver ...................... 351/57

* cited by examiner

Primary Examiner—Hung Xuan Dang
(74) Attorney, Agent, or Firm—Pro-Techtor International Services

(57) ABSTRACT

The present invention is to provide a pair of glasses that may be adjusted automatically, including a main frame having two side leg seats each respectively formed with a slide slot into which a slide may extend. The slide is connected with a lens frame, and may displace in the slide slot of the main frame so as to drive the lens frame to move relative the main frame, thereby compensating the deflection of the center of the lens when a user bows his head for reading or writing such that the center of the lens after calibration is still located on a viewing line, and so that the user may have a clear near view.

9 Claims, 13 Drawing Sheets

GLASSES CAPABLE OF ACCOMMODATING AUTOMATICALLY

BACKGROUND OF THE INVENTION

1. Field of the Invention

The present invention relates to a pair of glasses that may be adjusted automatically to improve the quality of vision while the user accommodating from far seeing to near seeing.

2. Description of the Related Art

Eyeglasses is used for correction of refractive error of user. The correct eyeglasses is determined by the correct power of the glasses and the centration of the glasses with the vision axis as well as the correct angle of the glasses with the visual axis.

As shown in FIGS. 1 and 3, when the user puts on a pair of conventional glasses to have a far view, the viewing line "a" and the lens 100 form an included angle equal 90 degree.

As shown in FIGS. 2 and 4, when the user bows his head for reading or writing to have a near view, his eyes are convergent. The viewing line a' is deflected from the center of the lens 100, thereby forming an error value equal to angle θ as shown in FIG. 4. The deflection distance between the viewing line a' and the center of the lens 100 is equal to "1". Thus, when the user has a near view, he easily feels uncomfortable due to the error of angle and the error of deflection of the center. To the best of our knowledge the classical eyeglasses never considered to compensate the angle of convergence and center shift while user accommodating from far to near. In this invention we resolved the problem induced by error of glasses while accommodating from far to near.

Few patents in USA have mentioned an adjustable eyeglasses. In U.S. Pat. No. 5,485,227 by me disclose a light transmission adjustable spectacle. In U.S. Pat. No. 5,133,595 to Gutbrod et al. disclose a length adjustable spectacle temple. In U.S. Pat. No. Des. 308,978 to Anger disclose an adjustable eyeglasses which can adjust the width of the frame and the length of the temple. In U.S. Pat. No. 5,987,640 to Ryder disclose a visor and eyeshield assembly which can flip the visor up or down for using or not using the visor. All the above mentioned patents are different from the present invention.

SUMMARY OF THE INVENTION

The primary objective of the present invention is to provide a pair of glasses that may be adjusted automatically. The main frame is formed with a slide slot. A slide fixed on the lens frame may slide in the slide slot, thereby automatically or manually compensating the deflection of the center of the lens when a user bows his head for reading or writing such that the center of the lens after calibration is still located on the user's viewing line, and so that the user may have a clear and comfort near vision.

Another objective of the present invention is to provide a pair of glasses that may be adjusted automatically. The main frame includes a bridge having two sides each respectively provided with a housing which is formed with a slide channel. The lens frame has a slide bar that may be extended into the slide channel of the housing. Displacement of the slide bar compensates the deflection of the center of the lens such that the center of the lens after calibration is still located on the user's viewing line.

A further objective of the present invention is to provide a pair of glasses that may be adjusted automatically. A returning elastic plate is mounted between the lens frame and the main frame. The returning elastic plate may automatically force the lens frame to return to its original position, so that the user may have a good horizontal view or far view.

In accordance with one aspect of the present invention, there is provided a pair of glasses that may be adjusted automatically, comprising: a main frame having two side leg seats each respectively formed with a slide slot into which a slide may extend, the slide connected with a lens frame, wherein the slide may displace in the slide slot of the main frame to drive the lens frame to move relative to the main frame, thereby compensating a deflection of a center of a lens when a user bows his head for reading or writing such that the center of the lens after calibration is still located on a viewing line, and so that the user may have a clear near view.

Further benefits and advantages of the present invention will become apparent after a careful reading of the detailed description with appropriate reference to the accompanying drawings.

DETAILED DESCRIPTION OF THE INVENTION

Figure 1:
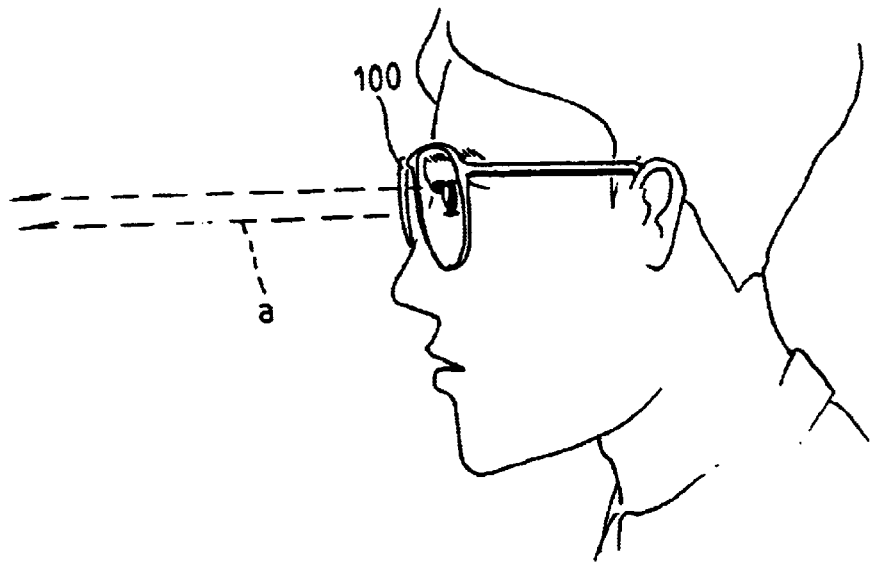
FIG. 1 is a perspective view of a pair of conventional glasses in accordance with the prior art.
Figure 2:
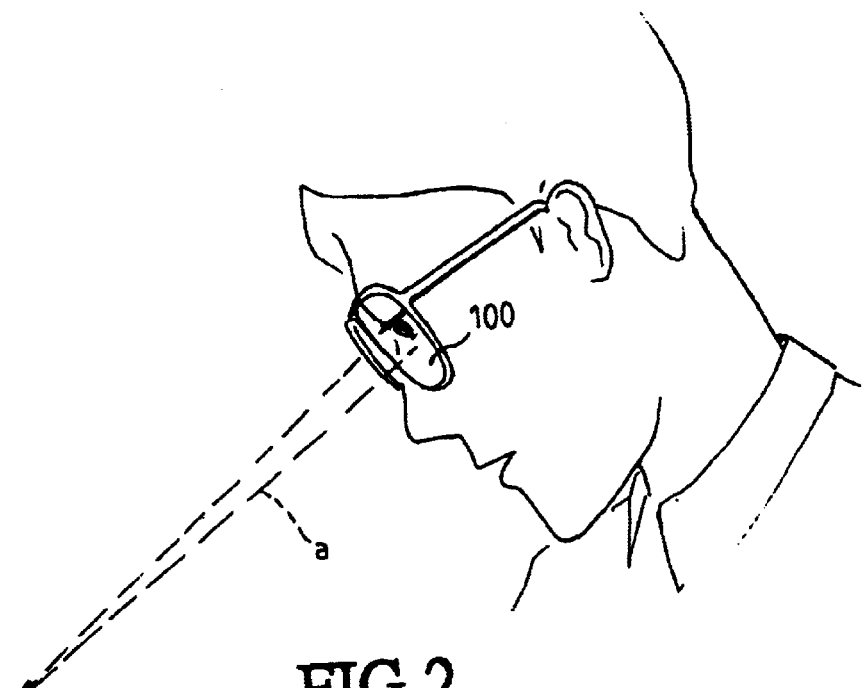
FIG. 2 is a perspective view of a pair of conventional glasses in accordance with the prior art.
Figure 3:
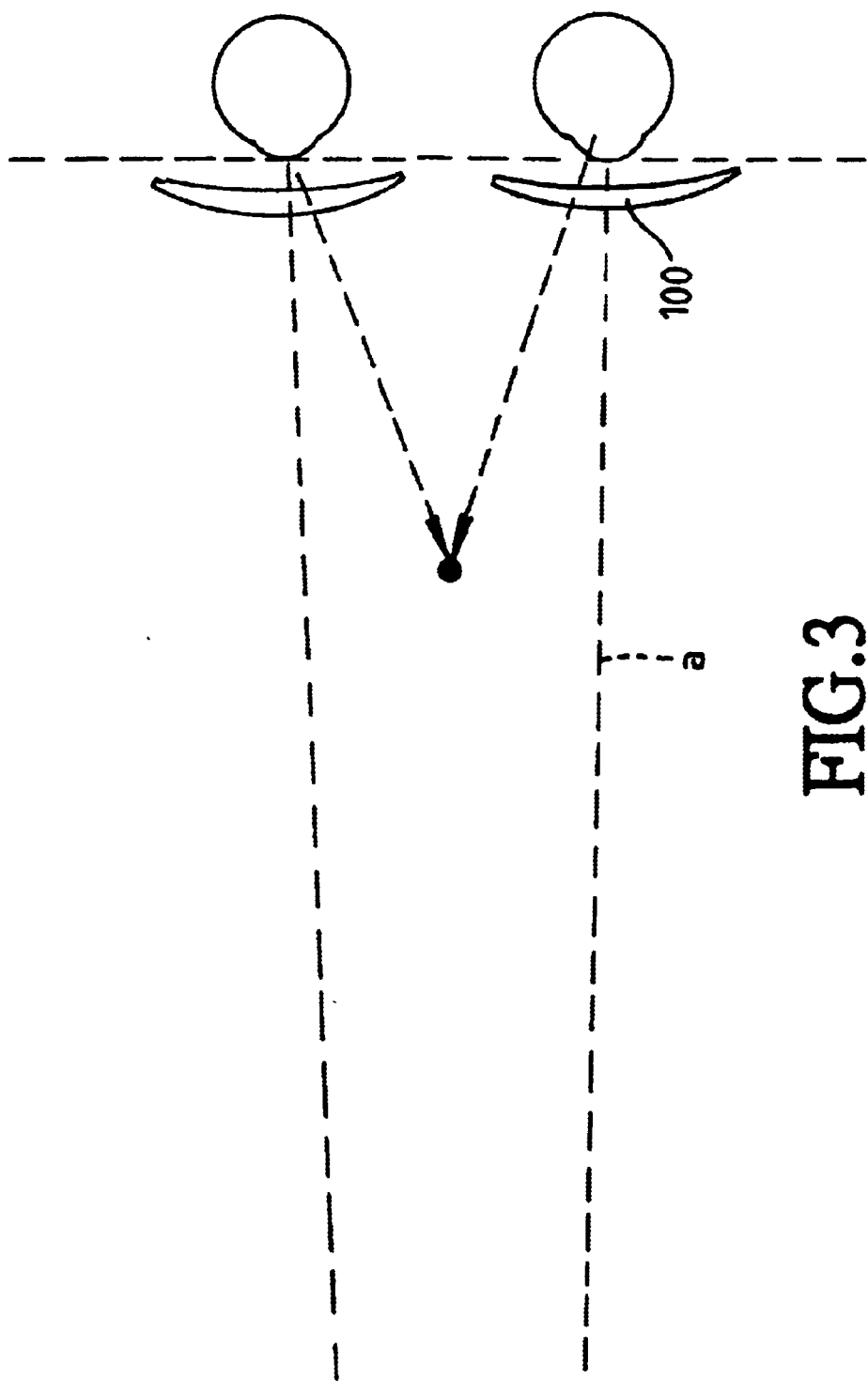
FIG. 3 is a schematic view of the visual axis while in far seeing.
Figure 4:
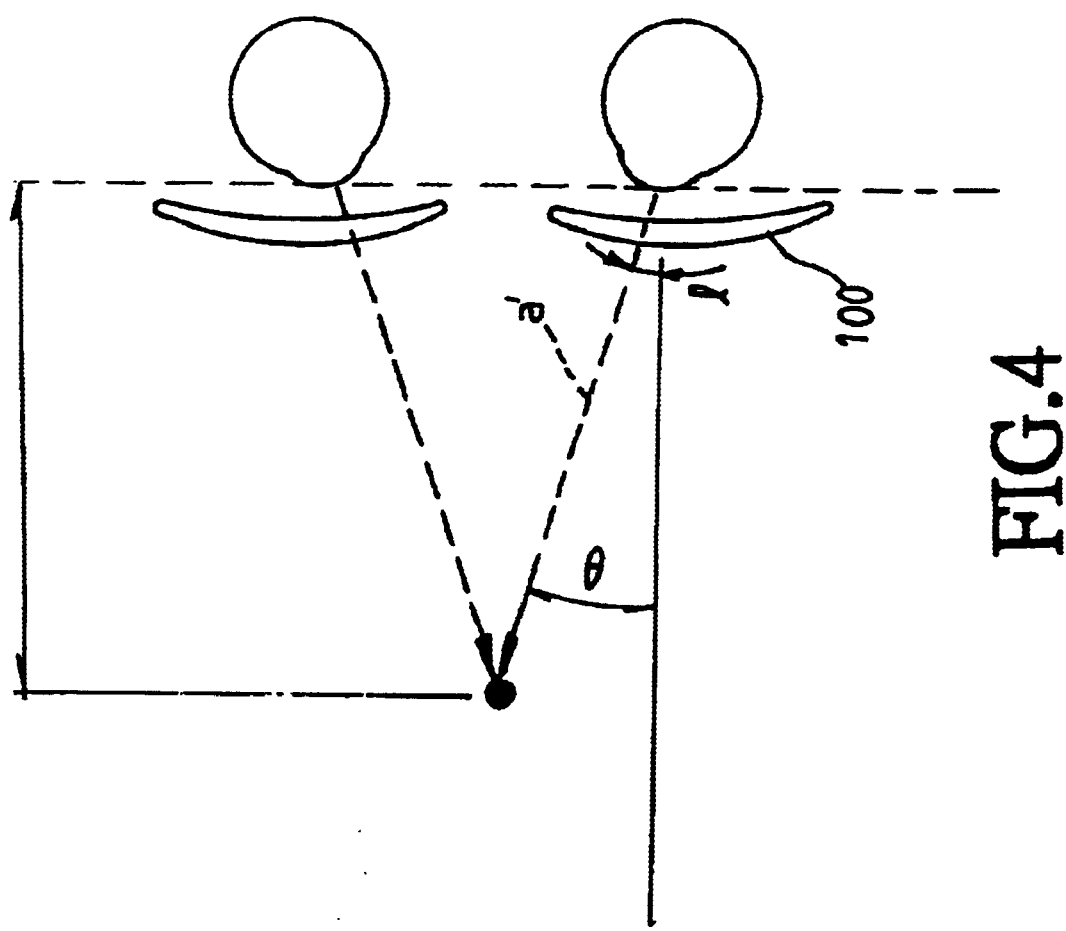
FIG. 4 is a schematic view of the visual axis while in near seeing.

Referring to the drawings and initially to FIGS. 5-8, a pair of glasses that may be adjusted automatically in accordance with a first embodiment of the present invention comprise a main frame 1 having two side leg seats 11 each respectively formed with a slide slot 111. The slide slot 111 has two ends respectively formed with an upper stop 112 and a lower stop 113 to function as control of a free travel. A slide 2 has a front end formed with two lugs 21 extended into the slide slot 111. The slide 2 is a positioning pin with an opened side, and is slightly bent. The slide 2 is formed with a U-shaped slit 22 which has an inner edge formed with a cross-shaped hole 23. A knob 3 has a front end formed with a protruding block 31 that may be extended into the cross-shaped hole 23. The knob 3 initially extends through the through hole 41 of the lens frame 4, then extends into the cross-shaped hole 23 of the slide 2.

Figure 5:
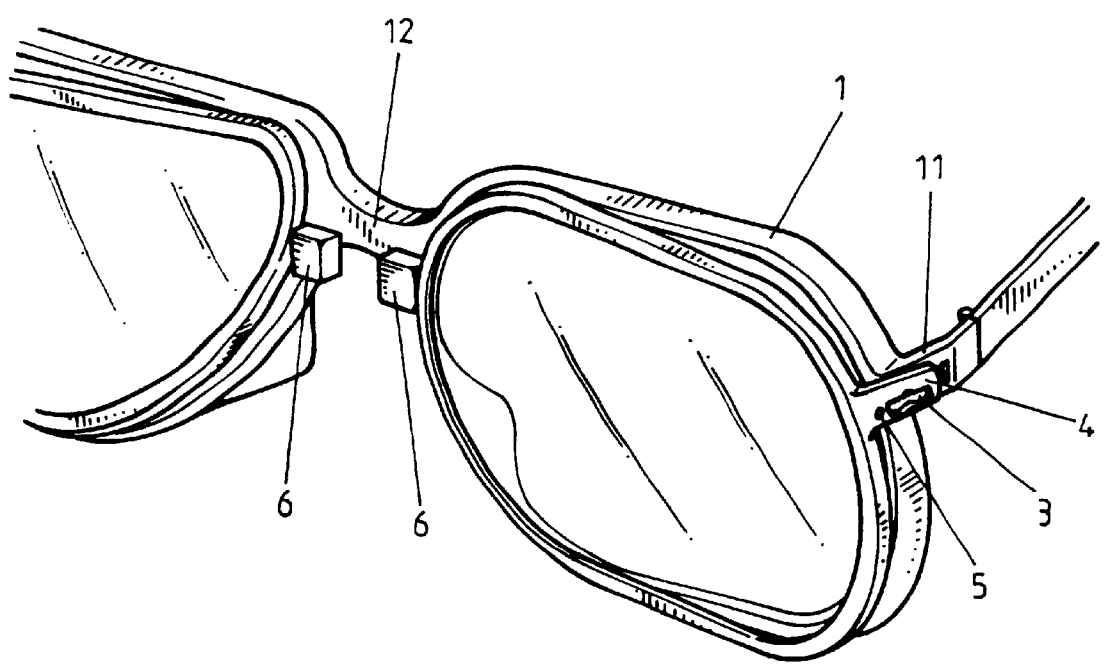
FIG. 5 is a perspective view of a pair of glasses that may be adjusted automatically in accordance with a first embodiment of the present invention.
Figure 6:
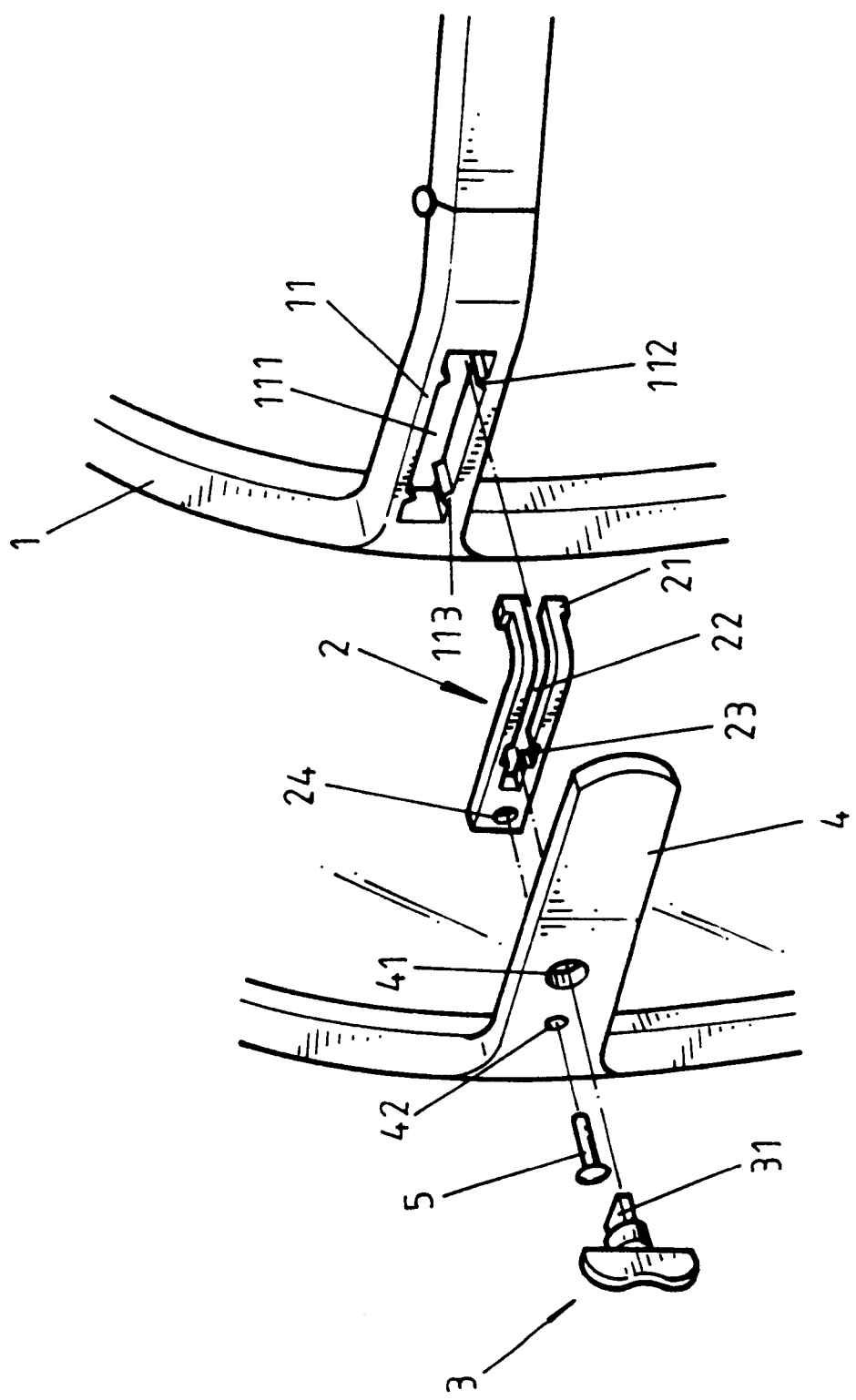
FIG. 6 is a partially exploded perspective view of the pair of glasses that may be adjusted automatically as shown in FIG. 5.
Figure 7:
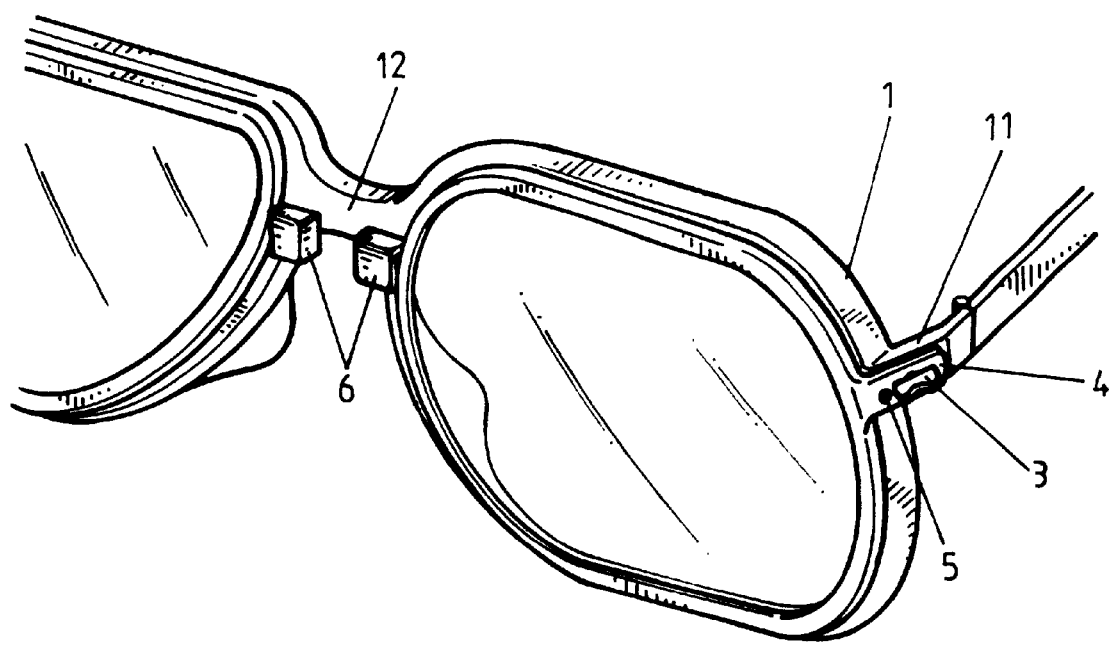
FIG. 7 is a schematic operational view of the pair of glasses that may be adjusted automatically as shown in FIG. 5.
Figure 8:
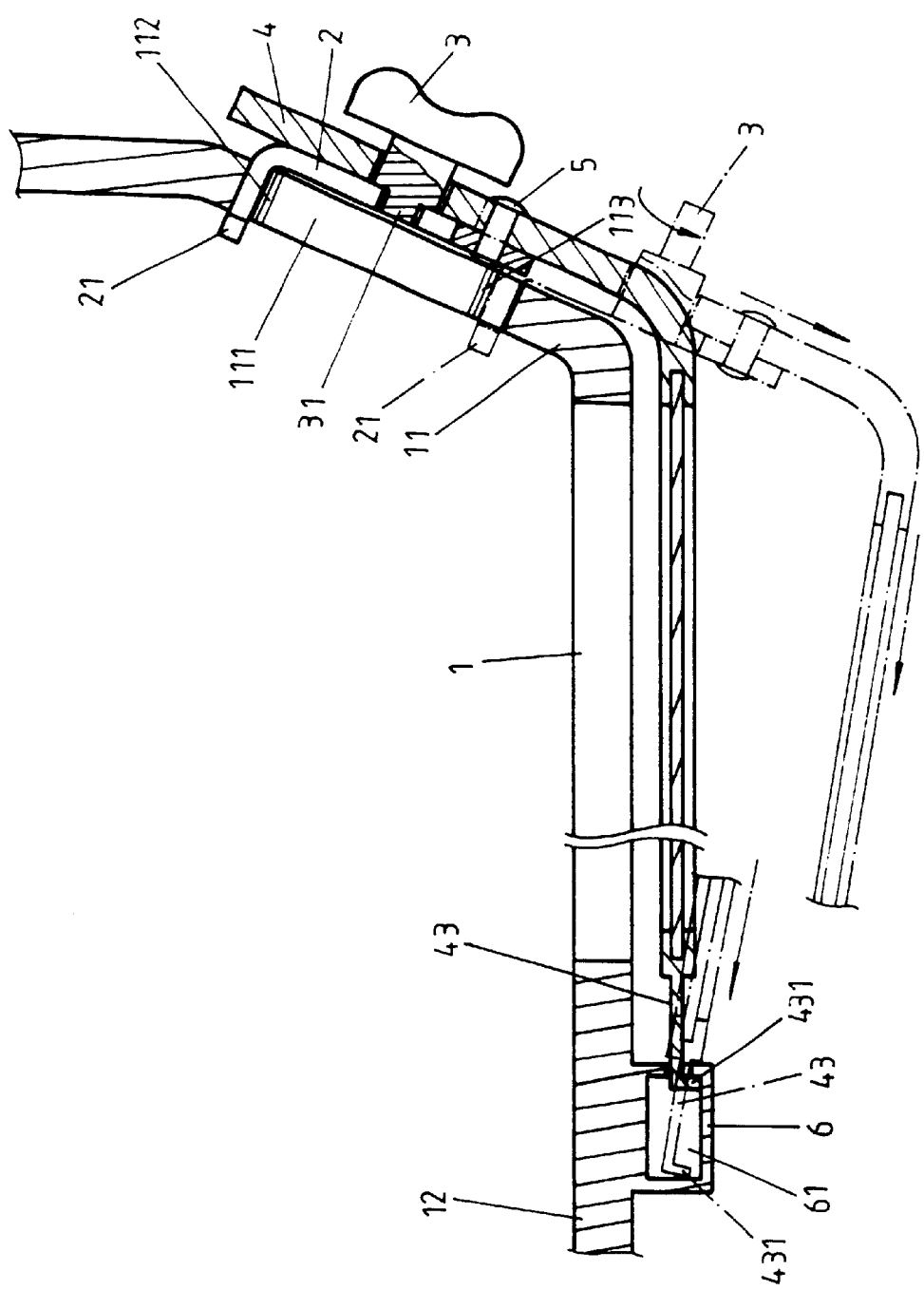
FIG. 8 is a cross-sectional operational view of the pair of glasses that may be adjusted automatically as shown in FIG. 5.

Referring to FIG. 8, when the protruding block 31 of the knob 3 is placed at the horizontal position of the U-shaped slit 22, the two lugs 21 of the slide 2 are not expanded outward, so that the slide 2 may freely slide in the slide slot 111 of the main frame 1 between the upper stop 112 and the lower stop 113 as shown in phantom lines. Thus, the lens frame 4 may be moved outward from the position as shown in FIG. 7 to the position as shown in FIG. 5. When the two lugs 21 of the slide 2 on the lens frame 4 slide to the position of the lower stop 113 of the main frame 1, the knob 3 may be rotated, whereby the protruding block 31 of the knob 3 is vertically locked in the cross-shaped hole 23 of the slide 2, so that the two lugs 21 of the slide 2 on the lens frame 4 are locked and fixed in the lower stop 113 of the main frame 1 without movement.

The slide 2 is formed with a pin hole 24 located beside the U-shaped slit 22. The lens frame 4 is formed with a hole 42 located beside the through hole 41. A fixing pin 5 is extended through the hole 42 of the lens frame 4, and is fixed in the pin hole 24 of the slide 2, so that the slide 2 are combined with the lens frame 4 integrally. Alternatively, the slide 2 may be combined with the lens frame 4 integrally by screws. Displacement of the slide 2 may drive the lens frame 4 to displace on the main frame 1. Thus, the lens frame 4 containing lenses may be adjusted to move from the position as shown in FIG. 7 to the position as shown in FIG. 5 by rotation of the knob 3, thereby compensating the deflection (angular deflection) of the center of the lens when the user bows his head for reading or writing so that the user may have a good near view.

In addition, the bridge 12 of the main frame 1 has two sides each respectively provided with a housing 6 to facilitate displacement of the lens frame 4 on the main frame 1. The housing 6 is formed with a slide channel 61 having an opened side. The lens frame 4 has a side formed with a slide bar 43 that may be extended into the slide channel 61 of the housing 6. The slide bar 43 has a top end formed with an inner slide foot 431 that may prevent the slide bar 43 from detaching from the housing 6. As shown in FIG. 8, the inner slide foot 431 is hooked on the opened side of the slide channel 61 of the housing 6 before displacement of the lens frame 4. When the lens frame 4 is displaced forward, the slide bar 43 is extended into the slide channel 61 of the housing 6.

Figure 9:
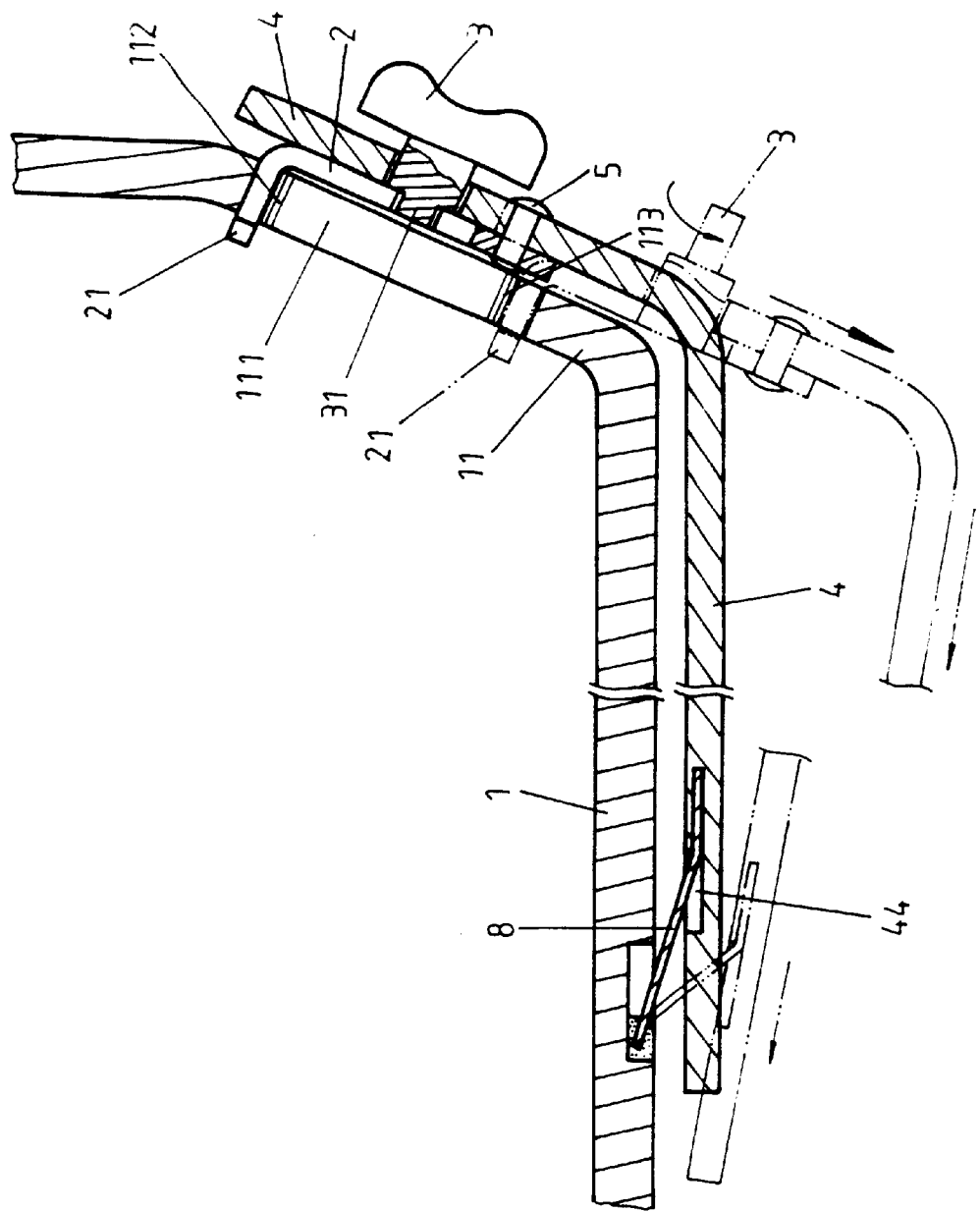
FIG. 9 is a cross-sectional operational view of the pair of glasses that may be adjusted automatically in accordance with a second embodiment of the present invention.

Referring to FIG. 9, in accordance with a second embodiment of the present invention, a returning elastic plate 8 is mounted between the lens frame 4 and the main frame 1. The returning elastic plate 8 has a first end fixed on the top edge of the main frame 1, and a second end extended into an elongated slot 44 defined in a top end of the lens frame 4 to slide therein. The returning elastic plate 8 may automatically force the lens frame 4 to return to the position as shown in FIG. 7 where the lens frame 4 closely abut the main frame 1, so that the user may have a good horizontal view or far view.

Figure 10:
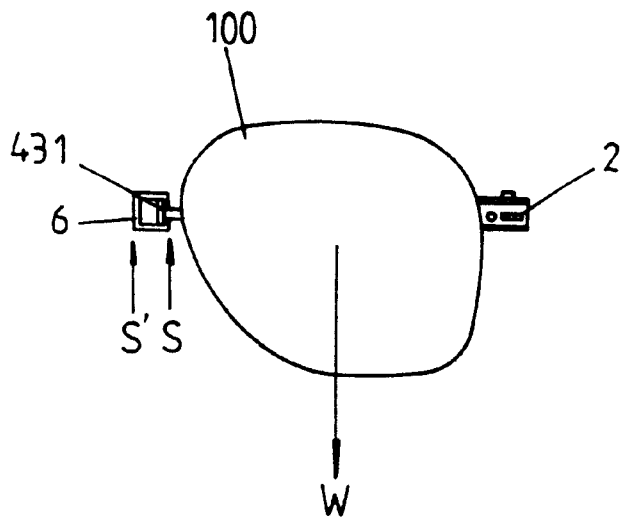
FIG. 10 is a schematic plan view of the pair of glasses that may be adjusted automatically, wherein the user has a far view.
Figure 11:
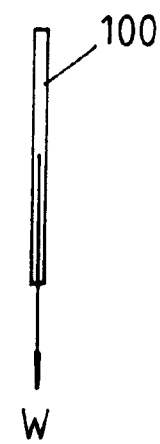
FIG. 11 is another schematic plan view of the pair of glasses that may be adjusted automatically, wherein the user has a far view.

Referring to FIGS. 10 and 11, when the user puts on the glasses of the present invention to have a far view, the lens 100 is subjected to a vertically downward gravity W without a component. Thus, the inner slide foot 431 is located at the outer-side position S of the housing 6.

Figure 12:
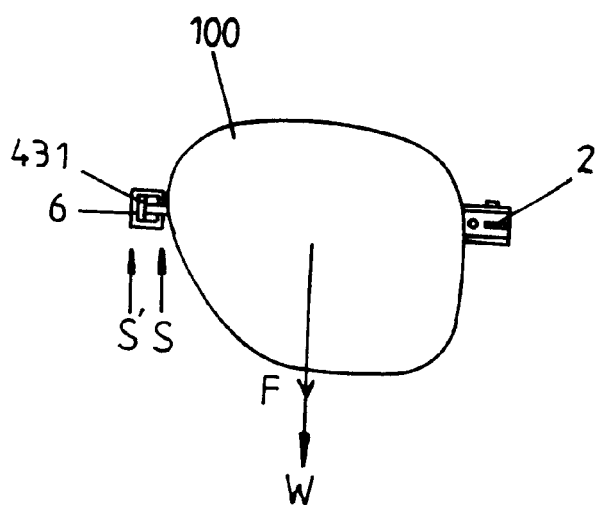
FIG. 12 is a schematic plan view of the pair of glasses that may be adjusted automatically, wherein the user has a near view.
Figure 13:
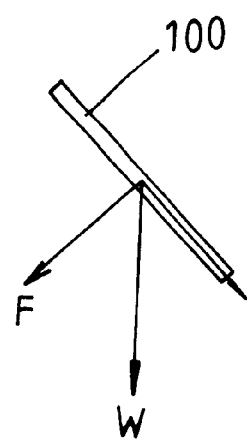
FIG. 13 is another schematic plan view of the pair of glasses that may be adjusted automatically, wherein the user has a near view.

Referring to FIGS. 12 and 13, when the user puts on the glasses of the present invention to have a near view, the lens 100 is subjected to a vertically downward gravity W with a component F which forces the lens 100 to move downward, so that the inner slide foot 431 may be displaced from the outer-side position S of the housing 6 to the inner-side position S' of the housing 6 by guidance of the slide 2 in the slide slot 111 of the main frame 1.

Figure 14:
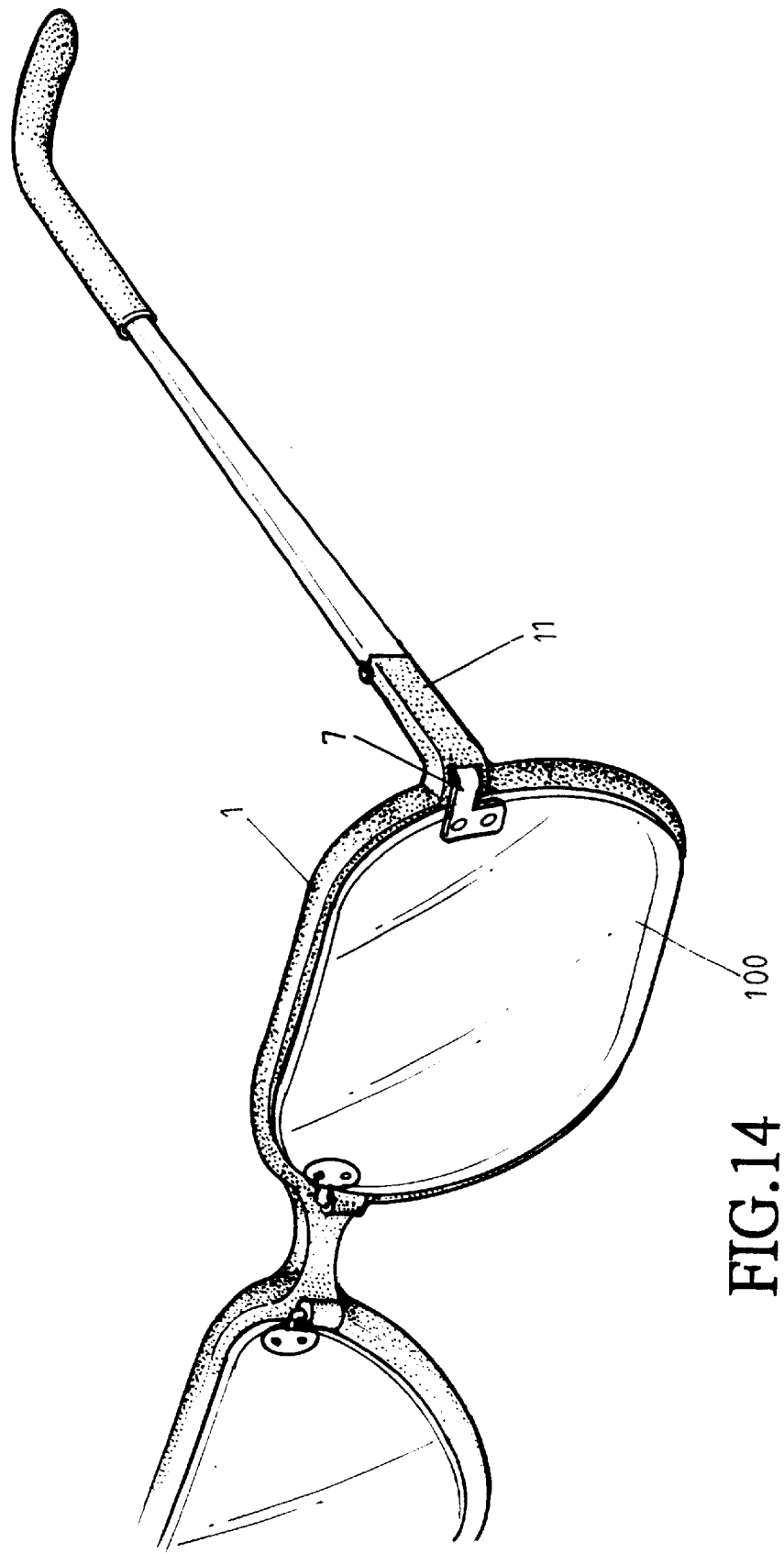
FIG. 14 is a perspective view of a pair of glasses that may be adjusted automatically in accordance with a third embodiment of the present invention.
Figure 17:
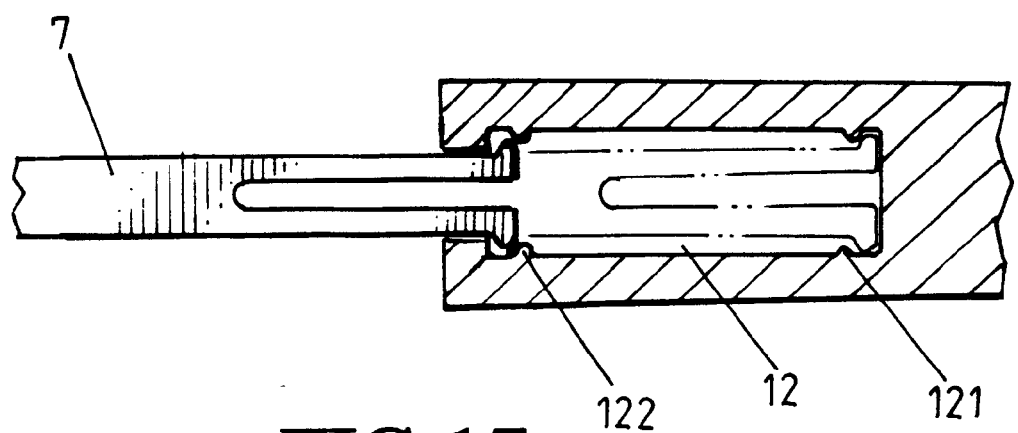
FIG. 17 is a partially cross-sectional view of the pair of glasses that may be adjusted automatically as shown in FIG. 14.

Referring to FIGS. 14–17, in accordance with a third embodiment of the present invention, each of the two side leg seats 11 of the main frame 1 is respectively formed with a recess 12 which has an inner side formed with an upper stop 121 and an outer side formed with an lower stop 122 as shown in FIG. 17. A slide 7 is fixed and combined with the lens 100 integrally. The slide 7 is also a positioning pin with an opened side. The slide 7 has a front end formed with two lugs 71 extended into and locked in the upper stop 121 and the lower stop 122 of the recess 12 of the main frame 1. As shown in FIGS. 14 and 17, the lugs 71 are locked in the upper stop 121, so that the user may put on the glasses of the present invention to have a far view.

Figure 15:
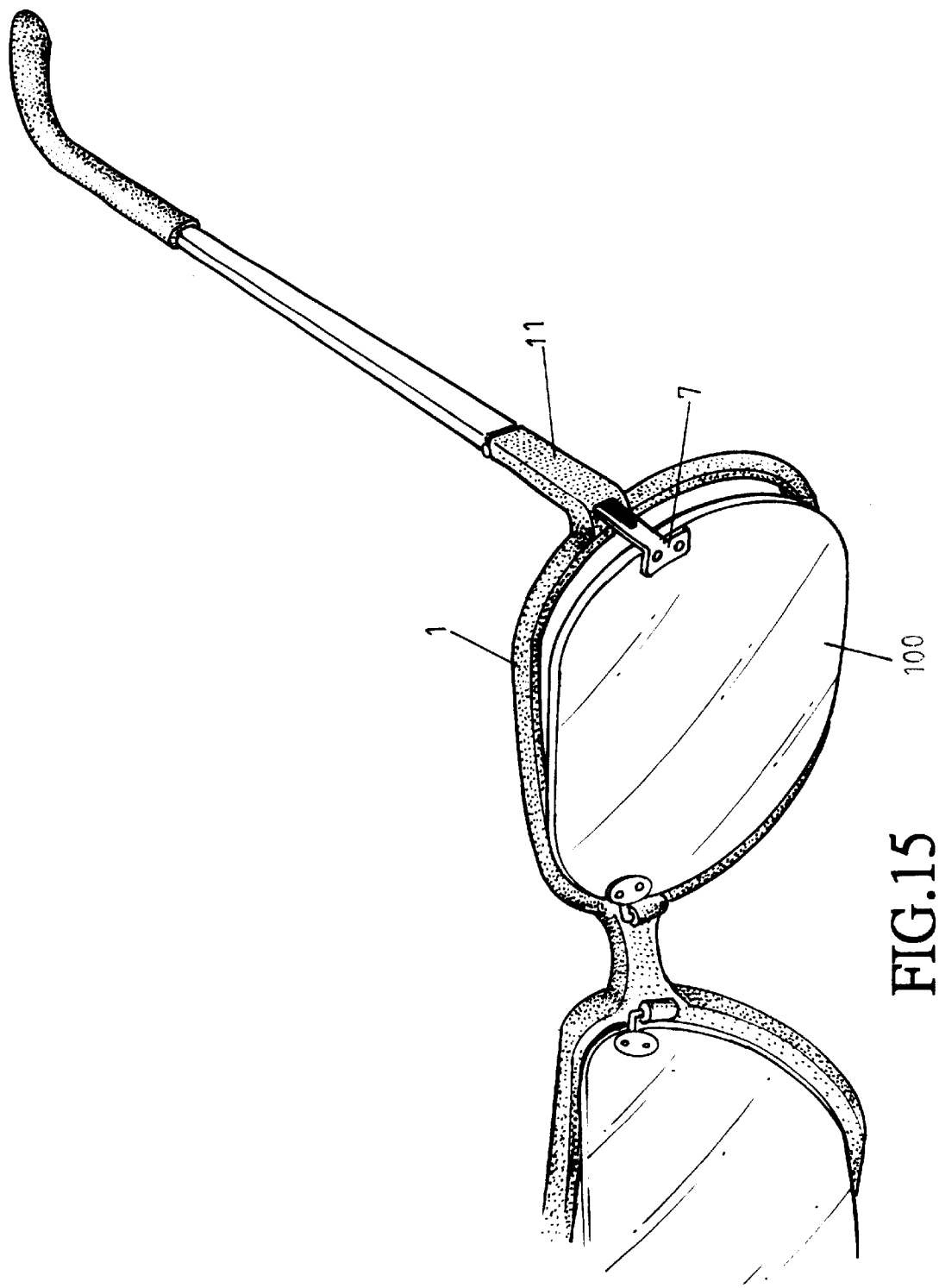
FIG. 15 is an operational view of the pair of glasses that may be adjusted automatically as shown in FIG. 14.
Figure 16:
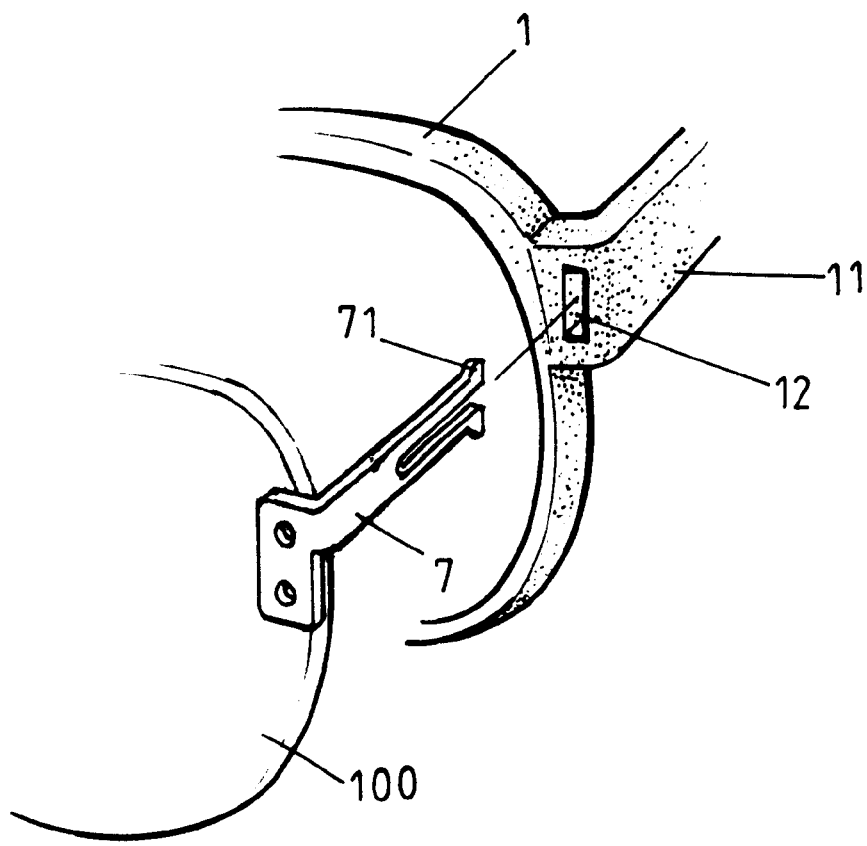
FIG. 16 is a partially exploded perspective view of the pair of glasses that may be adjusted automatically as shown in FIG. 14.

As shown in FIGS. 15 and 17, the lugs 71 may be adjusted to be locked in the lower stop 122, thereby compensating the deflection (angular deflection) of the center of the lens when the user bows his head for reading or writing so that the center of the lens after calibration is still located on the viewing line, and so that the user may have a clear near view.

Figure 18:
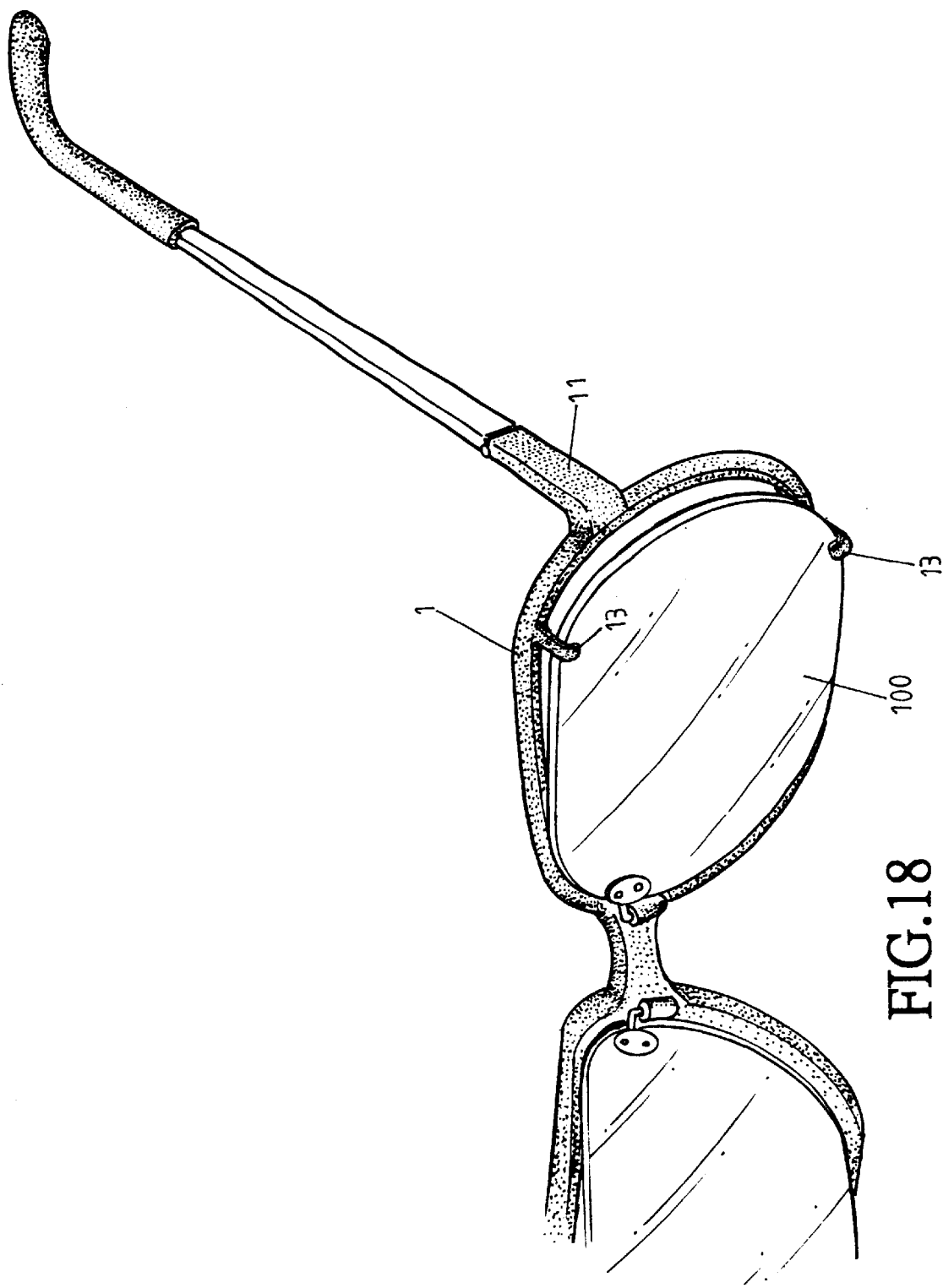
FIG. 18 is a partially perspective view of a pair of glasses that may be adjusted automatically in accordance with a fourth embodiment of the present invention.

Referring to FIG. 18, in accordance with a fourth embodiment of the present invention, the main frame 1 is provided with hooks 13 hooked on the lens 100 to function as a travel limiting mechanism.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of glasses that is adjusted automatically, comprising: a main frame having two side leg seats each respectively formed with a slide slot into which a slide extend, the slide connected with a lens frame, wherein the slide displace in the slide slot of the main frame to drive the lens frame to move relative to the main frame, thereby compensating a deflection of a center of a lens when a user bows his head for reading or writing such that the center of the lens is still located on a viewing line, and so that the user may have a clear near view.

2. The pair of glasses that is adjusted automatically in accordance with claim 1, wherein the lens is moved forward by a component of a gravity of the lens when the user bows his head for reading or writing.

3. The pair of glasses that is adjusted automatically in accordance with claim 1, wherein a friction of movement of the lens is controlled by a knob, thereby increasing the friction so that movement of the lens is adjusted manually.

4. The pair of glasses that is adjusted automatically in accordance with claim 1, wherein a friction of movement of the lens is controlled by a knob, thereby decreasing the friction so that a component of a gravity function as a power to automatically adjust movement of the lens.

5. The pair of glasses that is adjusted automatically in accordance with claim 1, wherein the slide slot has two ends respectively formed with an upper stop and a lower stop, the slide has one end formed with two lugs that is positioned between the upper stop and the lower stop, the slide is formed with a slit having a cross-shaped hole, a knob has a front end formed with a protruding block that is extended into the cross-shaped hole, the knob may extend through a through hole of the lens frame, and extend into the cross-shaped hole of the slide, the slide is formed with a pin hole located beside the slit, the lens frame is formed with a hole located beside the through hole, a fixing pin is extended through the hole of the lens frame, and is fixed in the pin hole of the slide, so that the slide are combined with the lens frame integrally.

6. The pair of glasses that is adjusted automatically in accordance with claim 1, wherein the main frame has a bridge having two sides each respectively provided with a housing, the housing is formed with a slide channel having an opened side, the lens frame has a side formed with a slide bar that is extended into the slide channel of the housing, the slide bar has a top end formed with an inner slide foot that prevent the slide bar from detaching from the housing.

7. The pair of glasses that is adjusted automatically in accordance with claim 1, further comprising a returning elastic plate mounted between the lens frame and the main frame, wherein the returning elastic plate has a first end fixed on a top edge of the main frame, and a second end extended into an elongated slot defined in a top end of the lens frame to slide therein.

8. The pair of glasses that is adjusted automatically in accordance with claim 1, wherein each of the two side leg seats of the main frame is respectively formed with a recess which has an inner side formed with an upper stop and an outer side formed with an lower stop, a slide fixed on the lens, and is extended into the recess, the slide is has a front end formed with two lugs extended into and locked in the upper stop and the lower stop of the recess of the main frame.

9. The pair of glasses that is adjusted automatically in accordance with claim 1, wherein the main frame is provided with hooks which is hook on the lens to function as a travel limiting mechanism.

* * * * *